(12) United States Patent
Lin (10) Patent No.: US 7,266,245 B1
(45) Date of Patent: Sep. 4, 2007

(54) IMAGE SIGNAL COMPRESSION METHOD AND SYSTEM

(75) Inventor: Shang-Hung Lin, Bothell, CA (US)

(73) Assignee: MagnaChip Semiconductor Ltd., Cheongju-si, Chung Cheongbuk-do (KR)

( * ) Notice: Subject to any disclaimer, the term of this patent is extended or adjusted under 35 U.S.C. 154(b) by 1063 days.

(21) Appl. No.: 10/112,265

(22) Filed: Mar. 28, 2002

(51) Int. Cl.
*G06K 9/46* (2006.01)

(52) U.S. Cl. .................... 382/232; 382/238; 348/390.1

(58) Field of Classification Search ............. 348/390.1, 348/394.1, 409.1; 382/232, 238
See application file for complete search history.

(56) References Cited

U.S. PATENT DOCUMENTS

| | | | | |
|---|---|---|---|---|
| 4,562,467 A | * | 12/1985 | Bradley ................. | 375/240.12 |
| 4,785,356 A | * | 11/1988 | Gonzales et al. ........... | 382/238 |
| 5,751,860 A | * | 5/1998 | Su et al. ...................... | 382/244 |
| 5,923,783 A | * | 7/1999 | Kawauchi et al. .......... | 382/233 |
| 6,100,933 A | * | 8/2000 | Coelho .................. | 375/240.24 |

* cited by examiner

*Primary Examiner*—Jose L. Couso
*Assistant Examiner*—Tom Y. Lu
(74) *Attorney, Agent, or Firm*—Fernandez & Associates, LLP (57) ABSTRACT

An image signal compression method and system. Without involving the current processing pixel, an encryption key and a decryption key are respectively and separately generated by a compression subsystem and a decompression subsystem. Both of the encryption and decryption keys are separately generated using the same principle of pixel prediction. Both of the encryption and decryption keys have the same value. In the compression subsystem, the encryption key is subtracted from the pixel value of the current processing pixel to generate a compressed data. In the decompression subsystem, the decryption key is added to the compressed data to recover the pixel value of the current processing pixel.

45 Claims, 7 Drawing Sheets

IMAGE SIGNAL COMPRESSION METHOD AND SYSTEM

FIELD OF THE INVENTION

The invention relates to image processing, particularly to image compression/decompression.

BACKGROUND

Gate count on the compression area of an image sensor chip used within a video capturing device (e.g., a digital camcorder or a web cam) is a major factor in the cost of the sensor chip. As such, if the gate count of the compression area can be reduced, then the manufacturing cost of the video capturing device containing the sensor chip can be reduced.

Compression methods such as JPEG are typically used to compress the video images captured by the sensor area of the sensor chip within the video capturing device (e.g., a digital camcorder). However, JPEG style compression area on a video capturing device requires buffers that occupy a sizeable portion of sensor chip in the video capturing device. The high gate count of the compression area necessitates high manufacturing cost of the video capturing device.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is made in detail to embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
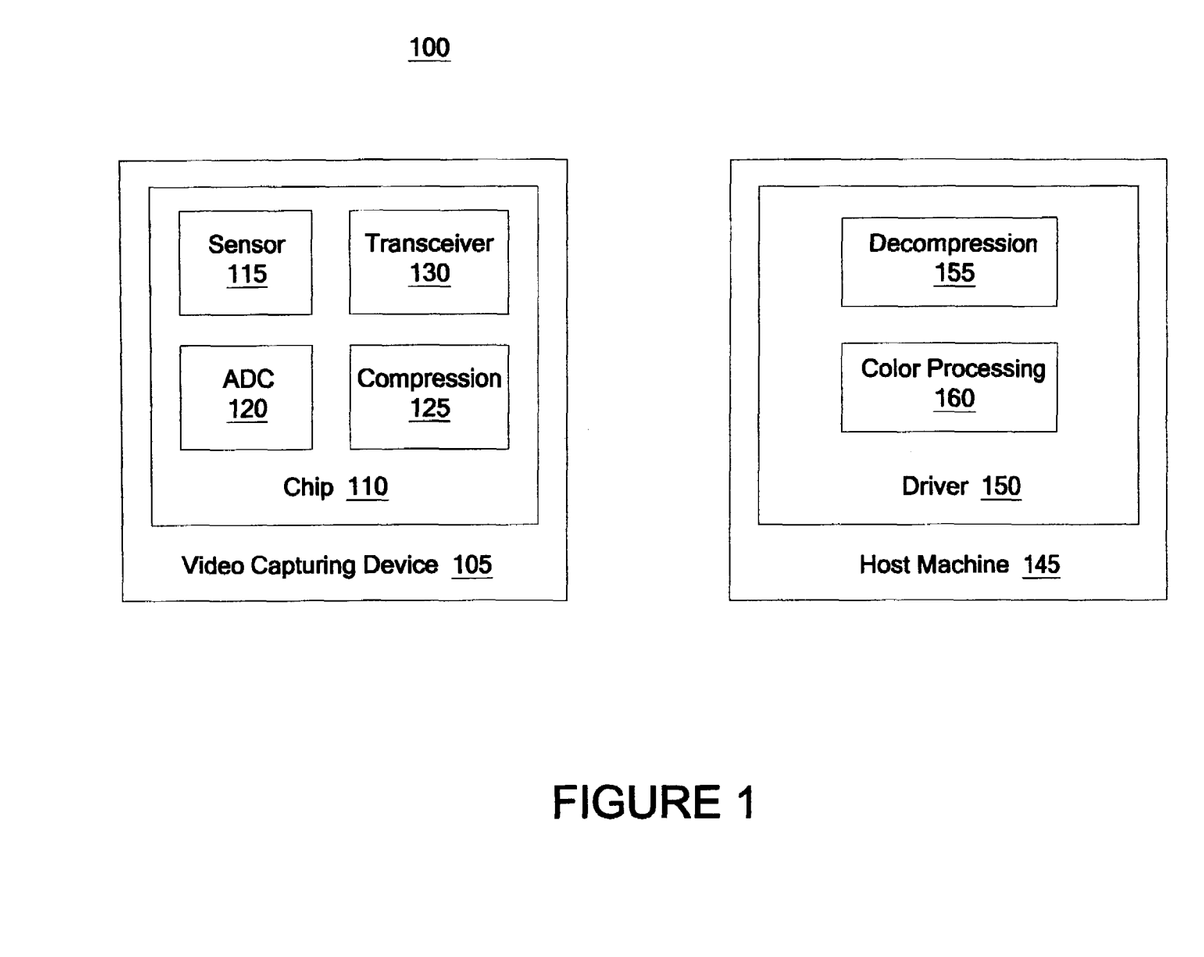
FIG. 1 shows a video stream delivery system for implementing compression and decompression in accordance with one embodiment of the invention.

Referring now to FIG. 1, a video stream delivery system 100 is shown for implementing compression and decompression methodology in accordance with one embodiment of the invention.

System 100 comprises an image capturing device 105 and a host machine 145. Device 105 is adapted for capturing, digitizing and compressing video images to be transmitted to host machine 145. Device 105 could be, but is not limited to, a digital camcorder, a digital still camera, a video phone, a video conferencing equipment, a PC camera, or a security monitor. On the other hand, host machine 145 is adapted for receiving, decompressing and image processing the compressed image data transmitted from device 105. Host machine 145 could be, but is not limited to, a PC, a PDA, a video phone, or any computing machine capable of performing the decompression in accordance with the present embodiment.

Video capturing device 105 comprises a chip 110 that comprises an image sensor 115, an analog-to-digital converter (ADC) 120, a compression engine 125 and a transceiver 130. Images are captured by sensor 115, then digitized by ADC 120 into pixel values. The pixel values are compressed by compression engine 125 using the compression technique of the present embodiment. The compressed pixel values are in turn transmitted to host machine 145. As understood herein, sensor 115 could be, but is not limited to, a CMOS sensor. Also, because the implemented compression technique is less complex than a conventional compression technique such as JPEG, compression engine 125 has lower gate count than a conventional compression engine. Furthermore, transceiver 130 could be, but is not limited to, a USB transceiver or a wireless transceiver.

Host machine 145 comprises an image processing driver 150 that comprises a decompression module 155 and image processing module 160. Upon arriving at host machine 145, the compressed image data is decompressed by decompression module 155 that performs the decompression technique of the present embodiment. The decompressed image data in turn undergo various image processing performed by image processing module 160.

Referring still to FIG. 1, on the side of image capturing device 105, at compression engine 125, compression is performed on a current processing pixel X by decomposing its pixel value P(X) into two parts: a compressed data delta (X) and an encryption key enKey(X). That is, P(X)=delta (X)+enKey(X). As such, delta(X) is the difference between P(X) and encryption key enKey(X). The value of encryption key enKey(X) is P(Q), the pixel value of a pixel Q that is chosen from among some neighboring pixels of the current processing pixel that are currently available in a line buffer of compression engine 125. Pixel Q is chosen based on the prediction that P(Q) is similar to P(X), thus likely resulting in a small delta(X) for efficient transmission to host machine 145. Using the prediction, P(Q) is likely to be nearest to P(X). Also, this similarity prediction does not require knowing P(X). Moreover, the similarity prediction for pixels X and Q is adapted to be performed by compression engine 125, which has a much lower gate count than a conventional compression technique such as JPEG.

Specifically, for the current processing pixel X, its pixel value P(X) is decompressed as delta(X)=P(X)−enKey(X), where enKey(X)=P(Q). In turn, delta(X) is transmitted to host machine 145.

Upon receiving delta(X) at host machine 145, decompression can be performed by decompression module 155 on a pixel x to assign a pixel value P(x) to x, where P(x)=P(X). (As understood herein, within the image that is undergoing compression and decompression, the pixel position of pixel x whose pixel value is being determined on the side of host machine 145 is the same as the pixel position of pixel X processed during compression on the side of device 105.)

A decryption key deKey(x) is used to decompress delta (X) into P(x), where P(x)=delta(X)+deKey(x). Decryption key deKey(x) is P(q), the pixel value of a pixel q that is chosen from among pixel x's neighboring pixels whose assigned pixels values have already been determined and are currently available in a line buffer of host machine 145. That is, P(x)=delta(X)+P(q). Pixel q is chosen based on the prediction that P(q) is similar to P(x), wherein the same prediction technique for predicting pixel Q is used. As such, this similarity prediction performed by decompression module 155 does not rely on knowing P(x).

As understood herein, within the image that is undergoing compression and decompression, the pixel position of the predicted pixel q is the same as the pixel position of the predicted pixel Q. Also, the positions of the neighboring pixels of x involved in predicting the position of pixel q (for generating deKey(x)) are the same as the positions of the neighboring pixels of X involved in predicting the position of pixel Q (for generating enKey(X)).

From the above, because deKey(x)=P(q), P(x)=delta(X)+deKey(x)=delta(X)+P(q). Also, because P(q)=P(Q), P(x)=delta(X)+P(Q)=P(X), which is the pixel value of X. As such, the pixel value of pixel x is successfully assigned the intended value, i.e., P(X), the pixel value of pixel X. Also, because P(q)=P(Q), enKey(X)=deKey(x). Moreover, encryption key enKey(X) is generated without involving P(X); decryption key deKey(x) are generated without involving P(x). The simplicity of pixel similarity prediction used for generating enKey(X) allows compression engine 125 to have lower gate count than required by a conventional compression technique such as JPEG.

Figure 2:
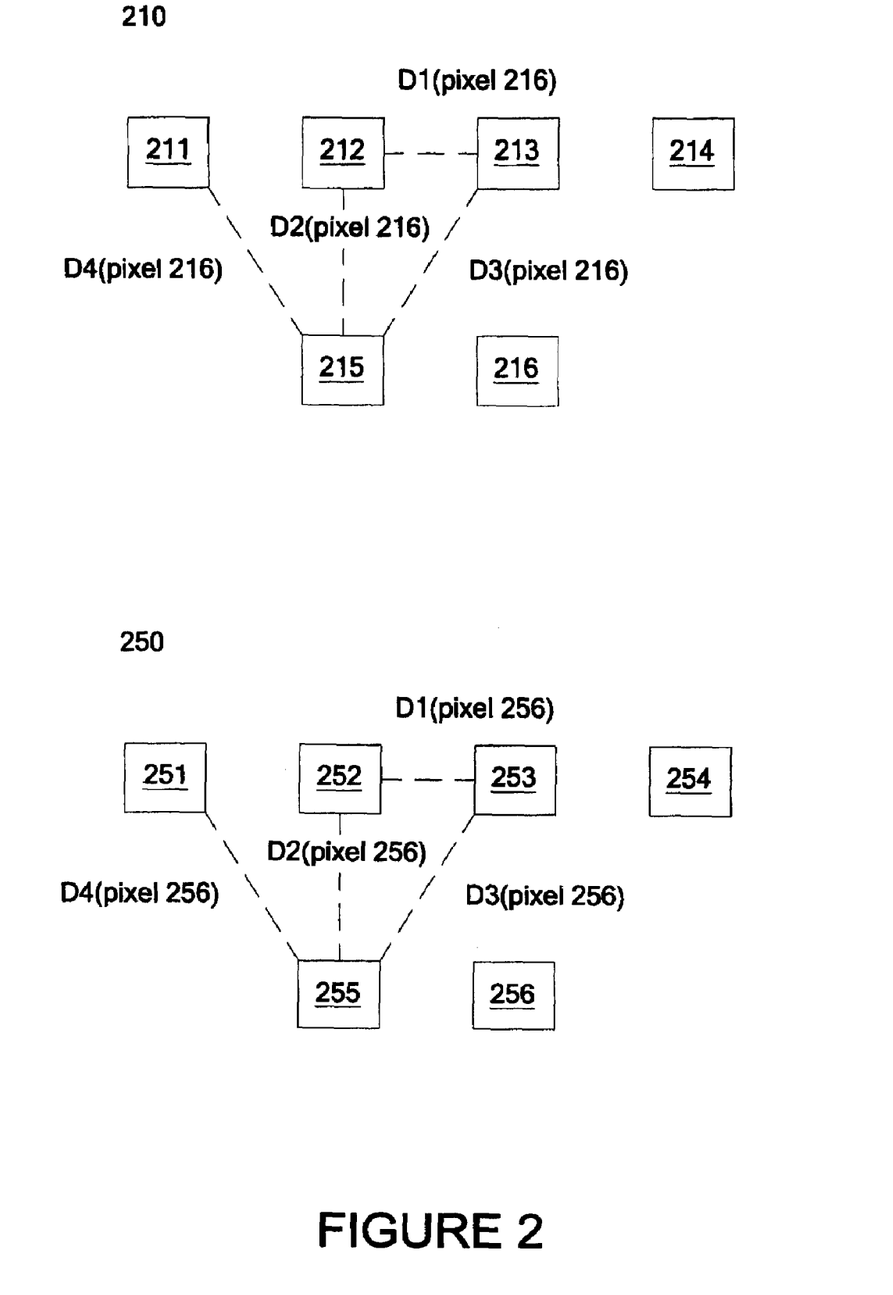
FIG. 2 shows pixel patterns for facilitating the discussion of the compression/decompression method in accordance with one embodiment of the invention.

Referring now to FIG. 2, pixel patterns 210 and 250 are shown to facilitate discussing the compression/decompression method in accordance with one embodiment of the invention. Pattern 210 relates to compression operation, while pattern 250 relates to decompression operation. Both patterns 210 and 250 refer to the same portion of an image undergoing compression and decompression of the present embodiment. Specifically, within the image being compressed and decompressed, pixels 211–216 of pattern 210 have the same respective positions as pixels 251–256 of pattern 250.

As understood herein, although not explicitly shown here, pattern 210 can be a part of a Bayer pattern. Similarly, although not explicitly shown here, pattern 250 can be a part of a Bayer pattern. Specifically, for examples, pixels 211–216 and pixels 251–256 can all be R-color channel pixels of a Bayer pattern. Or, pixels 211–216 and pixels 251–256 can all be B-color channel pixels on a Bayer pattern. Or, pixels 211–216 and pixels 251–256 can all be G-color channel pixels on a Bayer pattern. However, both patterns 210 and 250 need not be portions on a Bayer pattern. In another embodiment, patterns 210 and 250 are portions on a different type of pixel pattern.

Pixel 216 is the current processing pixel for compression. Pixels 211–215 have their pixel values currently buffered. Some of pixel values of pixels 211–215 are used to predict which pixel 21(?) among pixels 211–215 is likely to be similar in pixel value to the pixel value of pixel 216. Predicted pixel 21(?) is likely to have pixel value nearest to the pixel value of pixel 216. The pixel value of predicted pixel 21(?) is then used as a encryption key to compress the pixel value of pixel 216 into a compressed data delta(pixel 216), which is the difference between the pixel value of pixel 216 and the pixel value of predicted pixel 21(?). The compressed data, delta (pixel 216), is then transmitted to be decompressed.

Specifically, in preparation for predicting pixel 21(?) for compressing pixel 216, reference quantities D1(pixel 216), D2(pixel 216), D3(pixel 216) and D4(pixel 216) are determined on the compression side, wherein D1(pixel 216)=absolute pixel value difference between Pixels 212 and 213, D2(pixel 216)=absolute pixel value difference between pixels 212 and 215, D3(pixel 216)=absolute pixel value difference between pixels 213 and 215, and D4(pixel 216)=absolute pixel value difference between pixels 211 and 215.

Moreover, as understood herein, reference quantities D1(pixel 216), D2(pixel 216), D3(pixel 216) and D4(pixel 216) can be generalized with a function F that is not the absolute value function, wherein D1(pixel 216)=F(pixel 212, pixel 213), D2(pixel 216)=F(pixel 252, pixel 215), D3(pixel 216)=F(pixel 213, pixel 255), and D4(pixel 216)=F(pixel 211, pixel 215).

For example, F(a, b) can be (a*a−b*b). Or F(a, b) can be another function that quantifies the differences between quantities a and b.

D1(pixel 216), D2(pixel 216), D3(pixel 216) and D4(pixel 216) are associated respectively with pixels 213, 215, 214 and 212. The numerical ranking (i.e., the relative magnitudes) of D1(pixel 216), D2(pixel 216), D3(pixel 216) and D4(pixel 216) is used to predict which of pixel 213, 215, 214 and 212 is to be the predicted pixel 21(?). Again, pixel 21(?) is predicted to be likely similar to the current processing pixel, pixel 216. How D1(pixel 216), D2(pixel 216), D3(pixel 216) and D4(pixel 216) are to be used in predicting pixel 21(?) will be described in detail with reference to FIGS. 3A–D.

On the other hand, pixel 256 (having the same pixel position as pixel 216) is to be assigned through decompression a pixel value that is equal to pixel value of pixel 216. Pixels 251–255 already have their pixel values assigned through decompression. The pixel values of pixels 251–255 are buffered. Some of pixel values of pixels 251–255 are used to predict which pixel 25(?) among pixels 251–255 is likely to be similar in pixel value to the pixel value of pixel 256. The pixel value of the predicted pixel 25(?) is then used as a decryption key to decompress the received delta(pixel 216) into pixel value of pixel 256, which is the pixel value of predicted pixel 25(?) added to delta(pixel 216).

Specifically, in preparation for predicting pixel 25(?) for decompressing delta(pixel 216), reference quantities D1(pixel 256), D2(pixel 256), D3(pixel 256) and D4(pixel 256) are determined on the decompression side, wherein D1(pixel 256)=absolute pixel value difference between Pixels 252 and 253, D2(pixel 256)=absolute pixel value difference between pixels 252 and 255, D3(pixel 256)=absolute pixel value difference between pixels 253 and 255, and D4(pixel 256)=absolute pixel value difference between pixels 251 and 255.

Moreover, as understood herein, reference quantities D1(pixel 256), D2(pixel 256), D3(pixel 256) and D4(pixel 256) can be generalized with a function F that is not the absolute value function, wherein D1(pixel 256)=f(pixel 252, pixel 253),
D2(pixel 256)=f(pixel 252, pixel 255),
D3(pixel 256)=f(pixel 253, pixel 255), and
D4(pixel 256)=f(pixel 251, pixel 255).

For example, f(a, b) can be (a*a−b*b). Or f(a, b) can be another function that quantifies the differences between quantities a and b. Functions f and F can be different as long as the numerical ranking of D1(pixel 256), D2(pixel 256), D3(pixel 256) and D4(pixel 256) is the same as the numerical ranking of D1(pixel 216), D2(pixel 216), D3(pixel 216) and D4(pixel 216). For example, D2(pixel 256)>D1(pixel 256)>D3(pixel 256)>D4(pixel 256) if and only if D2(pixel 216)>D1(pixel 216)>D3(pixel 216)>D4(pixel 216). As another example, D4(pixel 256)>D1(pixel 256)>D3(pixel 256)>D2(pixel 256) if and only if D4(pixel 216)>D1(pixel 216)>D3(pixel 216)>D2(pixel 216).

D1(pixel 256), D2(pixel 256), D3(pixel 256) and D4(pixel 256) are associated respectively with pixels 253, 255, 254 and 252. The numerical ranking (i.e., the relative magnitudes) of D1(pixel 256), D2(pixel 256), D3(pixel 256) and D4(pixel 256) is used to predict which of pixel 253, 255, 254 and 252 is to be the predicted pixel 25(?). How D1(pixel 256), D2(pixel 256), D3(pixel 256) and D4(pixel 256) are to be used in predicting pixel 25(?) will be described in detail with reference to FIGS. 3A–D.

As understood herein, within the image to be compressed and decompressed, the pixel position of the predicted pixel 21(?) is the same as the pixel position of the predicted pixel 25(?).

Referring now to FIGS. 3A–D in view of FIG. 2, four scenarios of predicting values of encryption key and decryption key are shown in accordance with one embodiment of the invention.

Figure 3A:
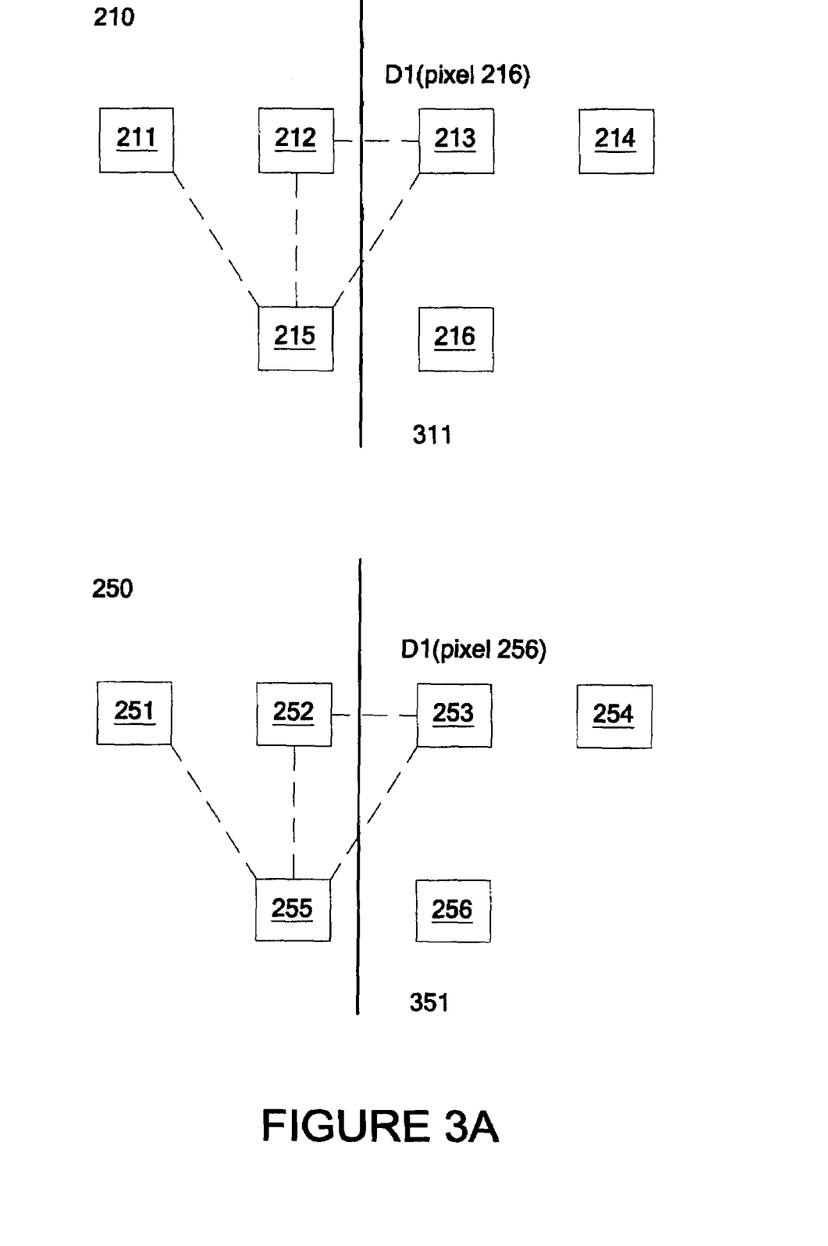
FIG. 3A demonstrates a scenario of predicting values of encryption key and decryption key in accordance with one embodiment of the invention.

Referring now to FIG. 3A in view of FIG. 2, a scenario of predicting values of encryption key (i.e., the pixel value of pixel 21(?)) and decryption key (i.e., the pixel value of pixel 25(?)) is shown in accordance with one embodiment of the invention. That is, in accordance with the embodiment, a scenario is shown for predicting which one of pixels 213, 215, 214 and 212 is the predicted pixel 21(?), and which one of pixels 253, 255, 254 and 252 is the predicted pixel 25(?).

In this scenario, D1(pixel 216) is found to be greater than D2(pixel 216), D3(pixel 216) and D4(pixel 216). Having D1(pixel 216) being the maximum suggests that a vertical edge 311 is likely to exist, with pixel 216 and pixel 213 on the same side of vertical edge 311. As such, being assumed to be on the same side of vertical edge 311, pixel 213 is assumed to have a pixel value similar or nearest to the pixel value of pixel 216. Therefore, in this scenario, the predicted pixel 21(?) is pixel 213. Encryption key is then the pixel value of pixel 213. The pixel value of pixel 216 is then compressed into its compressed form delta(pixel 216) as the difference between the pixel value of pixel 216 and the encryption key (i.e., the pixel value of pixel 213). The compressed data delta(pixel 216) is then transmitted for decompression.

Referring still to FIG. 3A in view of FIG. 2, D1(pixel 256) is also found to be greater than D2(pixel 256), D3(pixel 256) and D4(pixel 256) because D1(pixel 216) is found to be greater than D2(pixel 216), D3(pixel 216) and D4(pixel 216). (Recall that pixels 211, 212, 213 and 215 have respectively the same pixel values as pixels 251, 252, 253 and 255.) Having D1(pixel 256) being the maximum among D1(pixel 256), D2(pixel 256), D3(pixel 256) and D4(pixel 256) suggests that a vertical edge 351 is likely to exist, with pixel 256 and pixel 253 on the same side of vertical edge 351. As such, being assumed to be on the same side of vertical edge 351, pixel 253 is assumed to have a pixel value similar or nearest to the pixel value of pixel 256. Therefore, in this scenario, the predicted pixel 25(?) is pixel 253. Decryption key is then the pixel value of pixel 253. (Also, because the pixel value of pixel 253 is the same as the pixel value of pixel 213, the value of the decryption key is the same as the value of the encryption key.) The pixel value of pixel 256 is then determined by decompressing the received compressed data delta(pixel 216) into the pixel value of pixel 256 as delta(pixel 216) plus the decryption key (i.e., the pixel value of pixel 253).

Figure 3B:
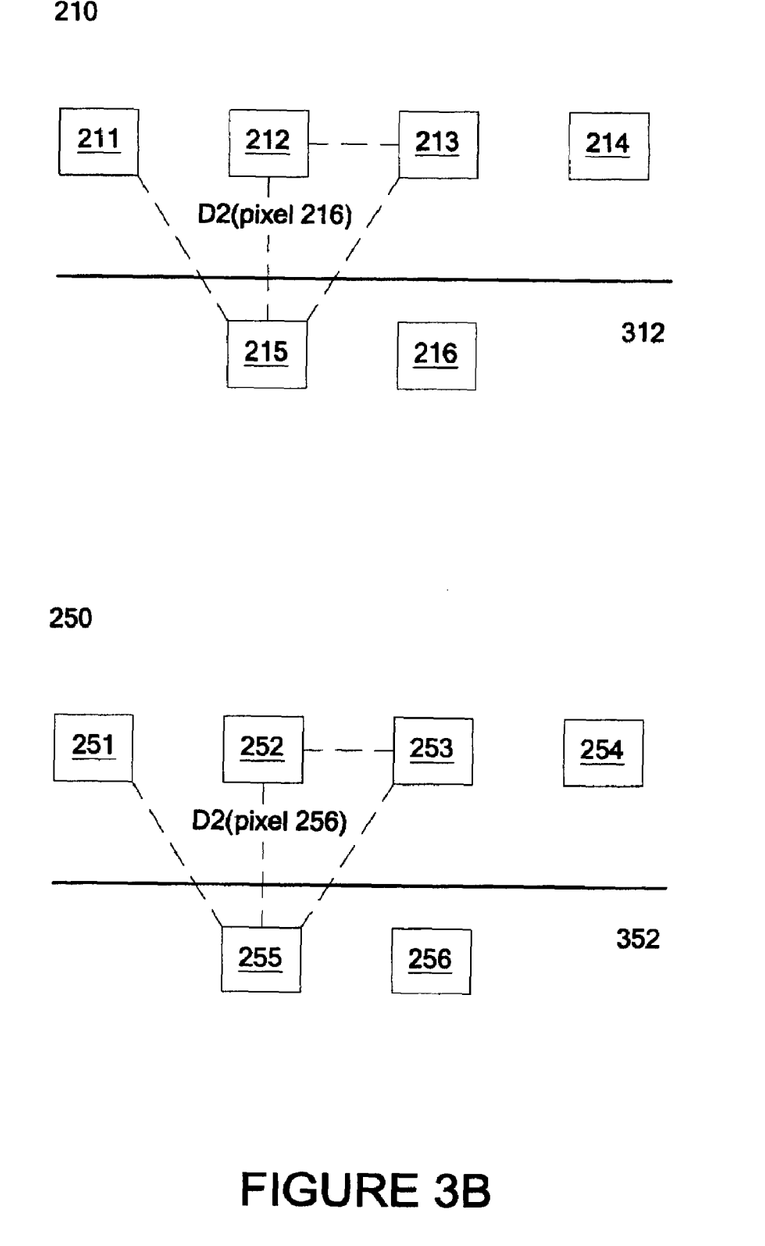
FIG. 3B demonstrates a scenario of predicting values of encryption key and decryption key in accordance with the embodiment for FIG. 3A.

Referring now to FIG. 3B in view of FIG. 2, another scenario of predicting values of encryption key (i.e., the pixel value of pixel 21(?)) and decryption key (i.e., the pixel value of pixel 25(?)) is shown in accordance with one embodiment of the invention. That is, in accordance with the embodiment, a scenario is shown for predicting which one of pixels 213, 215, 214 and 212 is the predicted pixel 21(?), and which one of pixels 253, 255, 254 and 252 is the predicted pixel 25(?).

In this scenario, D2(pixel 216) is found to be greater than D1(pixel 216), D3(pixel 216) and D4(pixel 216). Having D2(pixel 216) being the maximum suggests that a horizontal edge 312 is likely to exist, with pixel 216 and pixel 215 on the same side of horizontal edge 312. As such, being assumed to be on the same side of horizontal edge 312, pixel 215 is assumed to have a pixel value similar or nearest to the pixel value of pixel 216. Therefore, in this scenario, the predicted pixel 21(?) is pixel 215. Encryption key is then the pixel value of pixel 215. The pixel value of pixel 216 is then compressed into its compressed form delta(pixel 216) as the difference between the pixel value of pixel 216 and the encryption key (i.e., the pixel value of pixel 215). The compressed data delta(pixel 216) is then transmitted for decompression.

Referring still to FIG. 3B in view of FIG. 2, D2(pixel 256) is also found to be greater than D1(pixel 256), D3(pixel 256) and D4(pixel 256) because D2(pixel 216) is found to be greater than D1(pixel 216), D3(pixel 216) and D4(pixel 216). Having D2(pixel 256) being the maximum among D1(pixel 256), D2(pixel 256), D3(pixel 256) and D4(pixel 256) suggests that a horizontal edge 352 is likely to exist, with pixel 256 and pixel 255 on the same side of vertical edge 352. As such, being assumed to be on the same side of horizontal edge 352, pixel 255 is assumed to have a pixel value similar or nearest to the pixel value of pixel 256. Therefore, in this scenario, the predicted pixel 25(?) is pixel 255. Decryption key is then the pixel value of pixel 255. (Also, because the pixel value of pixel 255 is the same as the pixel value of pixel 215, the value of the decryption key is the same as the value of the encryption key.) The pixel value of pixel 256 is then determined by decompressing the received compressed data delta(pixel 216) into the pixel value of pixel 256 as delta(pixel 216) plus the decryption key (i.e., the pixel value of pixel 255).

Figure 3C:
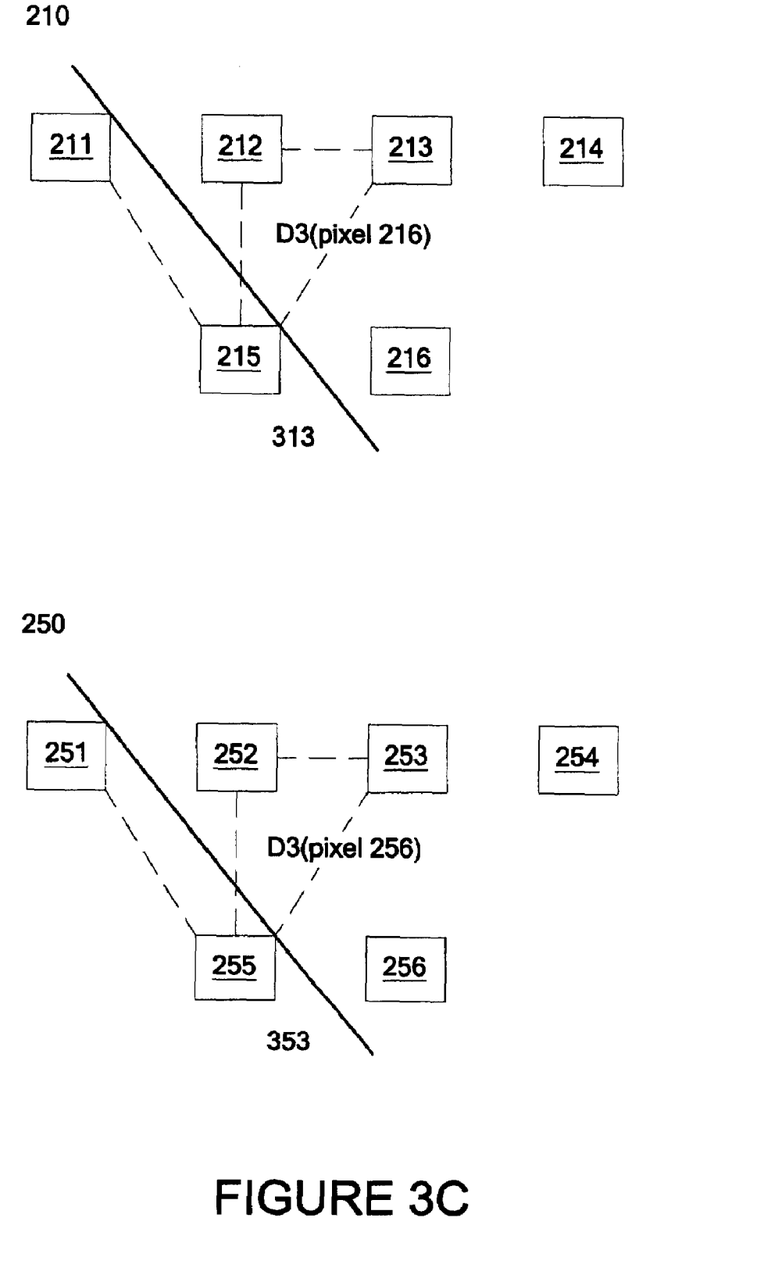
FIG. 3C demonstrates a scenario of predicting values of encryption key and decryption key in accordance with the embodiment for FIG. 3A.

Referring now to FIG. 3C in view of FIG. 2, another scenario of predicting values of encryption key (i.e., the pixel value of pixel 21(?)) and decryption key (i.e., the pixel value of pixel 25(?)) is shown in accordance with one embodiment of the invention. That is, in accordance with the embodiment, a scenario is shown for predicting which one of pixels 213, 215, 214 and 212 is the predicted pixel 21(?), and which one of pixels 253, 255, 254 and 252 is the predicted pixel 25(?).

In this scenario, D3(pixel 216) is found to be greater than D1(pixel 216), D2(pixel 216) and D4(pixel 216). Having D3(pixel 216) being the maximum suggests that a diagonal edge 313 is likely to exist, with pixel 216 and pixel 214 on the same side of diagonal edge 313. As such, being assumed to be on the same side of diagonal edge 313, pixel 214 is assumed to have a pixel value similar or nearest to the pixel value of pixel 216. Therefore, in this scenario, the predicted pixel 21(?) is pixel 214. Encryption key is then the pixel value of pixel 214. The pixel value of pixel 216 is then compressed into its compressed form delta(pixel 216) as the difference between the pixel value of pixel 216 and the encryption key (i.e., the pixel value of pixel 214). The compressed data delta(pixel 216) is then transmitted for decompression.

Referring still to FIG. 3C in view of FIG. 2, D3(pixel 256) is also found to be greater than D1(pixel 256), D2(pixel 256) and D4(pixel 256) because D3(pixel 216) is found to be greater than D1(pixel 216), D2(pixel 216) and D4(pixel 216). Having D3(pixel 256) being the maximum among D1(pixel 256), D2(pixel 256), D3(pixel 256) and D4(pixel 256) suggests that a diagonal edge 353 is likely to exist, with pixel 256 and pixel 254 on the same side of diagonal edge 353. As such, being assumed to be on the same side of diagonal edge 353, pixel 254 is assumed to have a pixel value similar or nearest to the pixel value of pixel 256. Therefore, in this scenario, the predicted pixel 25(?) is pixel 254. Decryption key is then the pixel value of pixel 254. (Also, because the pixel value of pixel 254 is the same as the pixel value of pixel 214, the value of the decryption key is the same as the value of the encryption key.) The pixel value of pixel 256 is then determined by decompressing the received compressed data delta(pixel 216) into the pixel value of pixel 256 as delta(pixel 216) plus the decryption key (i.e., the pixel value of pixel 254).

Figure 3D:
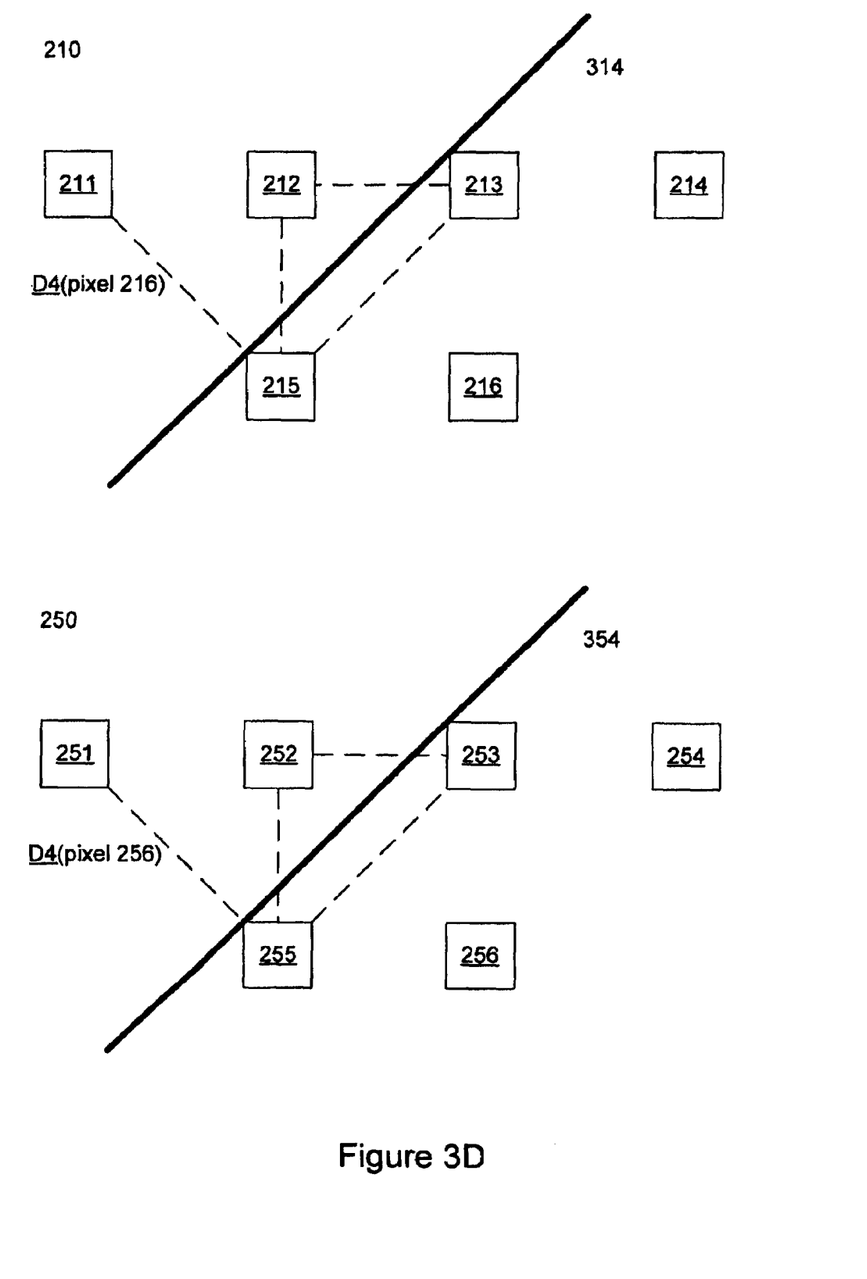
FIG. 3D demonstrates a scenario of predicting values of encryption key and decryption key in accordance with the embodiment for FIG. 3A.

Referring now to FIG. 3D in view of FIG. 2, yet another scenario of predicting values of encryption key (i.e., the pixel value of pixel 21(?)) and decryption key (i.e., the pixel value of pixel 25(?)) is shown in accordance with one embodiment of the invention. That is, in accordance with the embodiment, a scenario is shown for predicting which one of pixels 213, 215, 214 and 212 is the predicted pixel 21(?), and which one of pixels 253, 255, 254 and 252 is the predicted pixel 25(?).

In this scenario, D4(pixel 216) is found to be greater than D1(pixel 216), D2(pixel 216) and D3(pixel 216). Having D4(pixel 216) being the maximum suggests that a diagonal edge 314 is likely to exist, with pixel 216 and pixel 212 on the same side of diagonal edge 314. As such, being assumed to be on the same side of diagonal edge 314, pixel 212 is assumed to have a pixel value similar or nearest to the pixel value of pixel 216. Therefore, in this scenario, the predicted pixel 21(?) is pixel 212. Encryption key is then the pixel value of pixel 212. The pixel value of pixel 216 is then compressed into its compressed form delta(pixel 216) as the difference between the pixel value of pixel 216 and the encryption key (i.e., the pixel value of pixel 212). The compressed data delta(pixel 216) is then transmitted for decompression.

Referring still to FIG. 3D in view of FIG. 2, D4(pixel 256) is also found to be greater than D1(pixel 256), D2(pixel 256) and D3(pixel 256) because D4(pixel 216) is found to be greater than D1(pixel 216), D2(pixel 216) and D3(pixel 216). Having D4(pixel 256) being the maximum among D1(pixel 256), D2(pixel 256), D3(pixel 256) and D4(pixel 256) suggests that a diagonal edge 354 is likely to exist, with pixel 256 and pixel 252 on the same side of diagonal edge 354. As such, being assumed to be on the same side of diagonal edge 354, pixel 252 is assumed to have a pixel value similar or nearest to the pixel value of pixel 256. Therefore, in this scenario, the predicted pixel 25(?) is pixel 252. Decryption key is then the pixel value of pixel 252. (Also, because the pixel value of pixel 252 is the same as the pixel value of pixel 212, the value of the decryption key is the same as the value of the encryption key.) The pixel value of pixel 256 is then determined by decompressing the received compressed data delta(pixel 216) into the pixel value of pixel 256 as delta(pixel 216) plus the decryption key (i.e., the pixel value of pixel 252).

As understood herein, not all of the scenarios need to be implemented for the present invention. For example, in another embodiment of the invention, compression/decompression scheme is further simplified, wherein scenarios discussed in FIGS. 3C–D are not supported.

Figure 4:
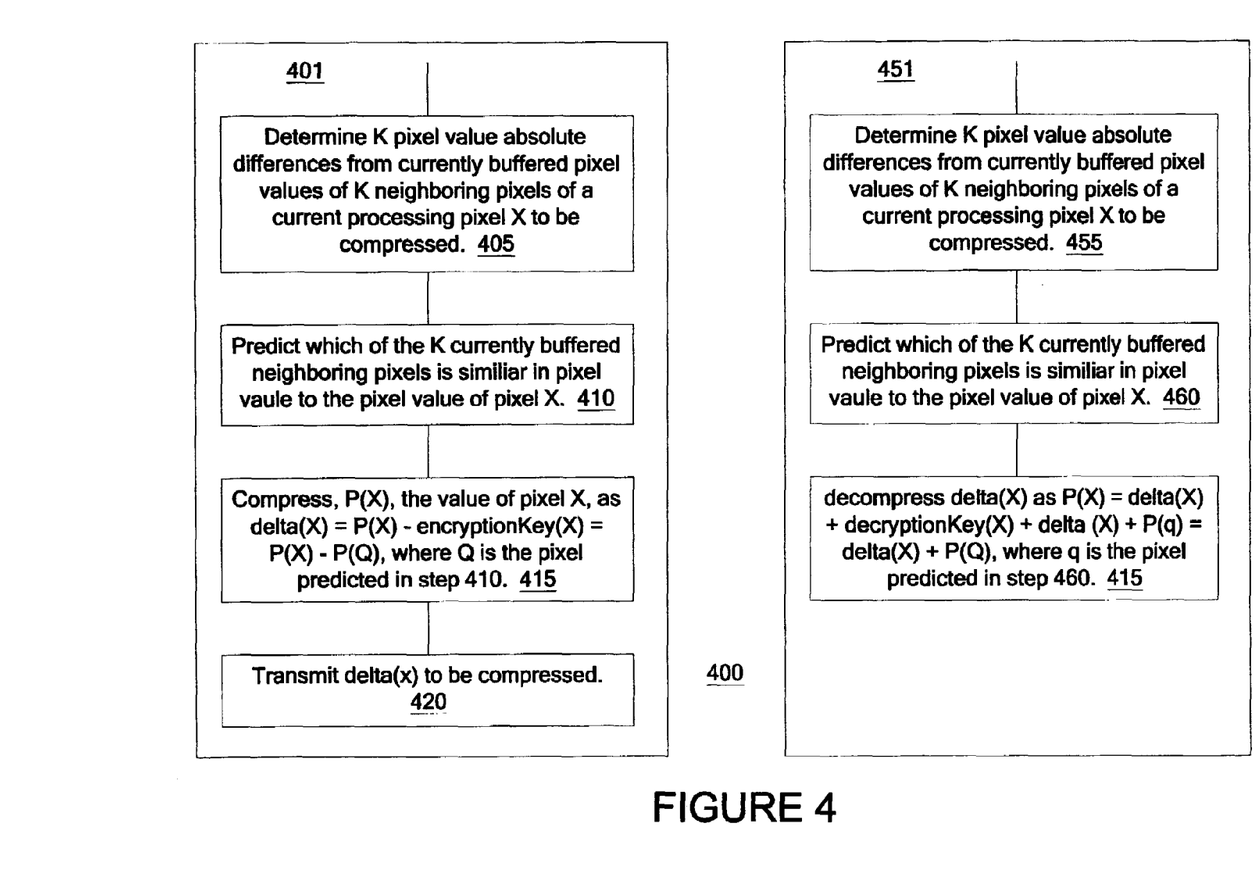
FIG. 4 is a flow chart that outlines steps for performing compression and decompression in accordance with one embodiment of the invention.

Referring now to FIG. 4 in view of FIGS. 2 and 3A–D, a flow chart is shown outlining steps for performing compression and decompression in accordance with one embodiment of the invention. These steps are organized into two branches 401 and 451. Steps 405, 410, 415 and 420 in branch 401 are involved for compression in accordance with one embodiment of the invention, while steps 455, 460 and 460 in branch 451 are involved for decompression in accordance with the same embodiment of the invention. Specifically, steps 405, 410, 415 and 420 in branch 401 are performed for compressing a currently processing pixel X. Steps 455, 460 and 465 in branch 451 are performed for decompressing the pixel value of a pixel x whose position within the image being compressed/decompressed is the same as the pixel position of the currently processing pixel. Branches 401 and 451 are described in parallel.

In step 405 (for compression; branch 401), for current processing pixel X being compressed, pixel value absolute differences are determined from among K neighboring pixels of pixel X that are currently buffered.

As understood herein, a function F that is different from the absolute value function can be implemented also, as long as function F quantifies the difference between two pixel values, and the numerical ranking of the pixel value differences is the same as the numerical ranking of the pixel value differences found in step 455. For example, function F(a, b) can be (a*a−b*b).

Likewise, in step 455 (for decompression; branch 451), for decompressing the pixel value of pixel x, pixel value absolute differences are determined from among k neighboring pixels of pixel x that are buffered. The number k is equal to the number K in step 405. Furthermore, within the image being compressed and decompressed, the positions of these k buffered neighboring pixels of pixel x are respectively the same as the positions of those K buffered neighboring pixels of pixel X in step 405.

As understood herein, a function f that is different from the absolute value function can be implemented also, as long as function f quantifies the difference between two pixel values, and the numerical ranking of the pixel value differences is the same as the numerical ranking of the pixel value differences found in step 405. For example, function f(a, b) can be (a*a−b*b).

In step 410 (for compression; branch 401), one of buffered neighboring pixel Q of pixel X is predicted to have pixel value similar to the pixel value of pixel X. This prediction is based on which absolute pixel value difference is the greatest among the absolute differences determined in step 405. Specifically, each absolute pixel value difference is associated with a buffered neighboring pixel of pixel X. The predicted pixel Q is associated with the greatest absolute pixel value difference determined in step 405.

Likewise, in step 460 (for decompression; branch 451), one of buffered neighboring pixel q of pixel x is predicted to have pixel value similar to the pixel value of pixel x. This prediction is based on the same principle as the principle relied by the prediction in step 410. That is, this prediction is also based on which absolute pixel value difference is the greatest among the absolute pixel value differences determined in step 455. Specifically, each absolute pixel value difference is associated with a buffered neighboring pixel of pixel x. The predicted pixel q is associated with the greatest absolute pixel value difference determined in step 455. Moreover, within the image being compressed and decompressed, the position of pixel q is the same as the position of pixel Q. As such, the pixel value of the predicted pixel q (i.e., the encryption key) is the same as the pixel value of the predicted pixel Q (i.e., the decryption key).

In step 415 (for compression; branch 401), pixel value of pixel X is encrypted into a compressed data delta(X) by using a encryption key. The encryption key is the pixel value of the predicted pixel Q found in step 410. Specifically, delta (X) is the difference between the pixel value of pixel X and the encryption key.

In step 420 (for compression; branch 401), the compressed data delta(X) is transmitted to be decompressed.

In step 465 (for decompression; branch 451), upon receiving the transmitted compressed data delta(X), delta(X) is decrypted into the pixel value of x by using a decryption key. The decryption key is the pixel value of the predicted pixel q found in step 460. Specifically, the pixel value of x is delta(X) plus the decryption key. Because decryption key is the value of the predicted pixel q that is equal to the pixel value of the predicted pixel Q. As such, the pixel value of x is successfully recovered to be equal to the pixel value of pixel X. Thus, compression/decompression cycle for pixels X and x is successfully performed.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for compressing and decompressing image signal, said method comprising:
   a) a compression method for compressing a currently processing pixel X, said compression method comprising the steps of:
     a1) determining first N pixel value differences respectively for N pairs of pixels belonging to first K neighboring pixels of said pixel X that have respectively first K currently buffered pixel values, wherein each of said first N pixel value differences is associated with one of said first K neighboring pixels;
     a2) predicting a pixel Q to have similar pixel value with said pixel X by choosing said pixel Q from said K neighboring pixels, said pixel Q associated with one of said first pixel value differences that has the greatest value among said first N absolute pixel value differences; and
     a3) compressing P(X) into a compressed data delta(X) to be transmitted for decompression, said delta(X) =P(X)−enKey(X), wherein said enKey(X) denotes an encryption key for compressing P(X) into said delta(X), said enKey(X) having value of P(Q), the pixel value of pixel Q.

2. The method of claim 1, further comprising:
   b) a decompression method for decompressing said delta (X) to recover the pixel value P(x) of a pixel x whose position within an image being compressed and decompressed is the same as the pixel position of said currently processing pixel X, said decompression method comprising the steps of:
     b1) determining second N pixel value differences respectively for N pairs of pixels belonging to second K neighboring pixels of said pixel x that have respectively second K buffered pixel values, wherein each of said second N pixel value differences is associated with one of said second K neighboring pixels, said second N pixel value differences having numerical ranking equaling to that of said first N pixel value differences the pixel positions of said second K pixels equaling respectively to the pixel positions of said first K pixels, the pixel values of said second K neighboring pixels equaling respectively to the pixel values of said first K neighboring pixels;
     b2) predicting a pixel q to have similar pixel value with said pixel x by choosing said pixel q from said second K neighboring pixels, said pixel q with its pixel value P(q) is associated with one of said second N pixel value differences that has the greatest value among said second N pixel value differences, said P(q) equaling to said P(Q); and
     b3) decompressing said delta(X) into said P(x), said P(x)=delta(X)+deKey(x), wherein said deKey(x) denotes a decryption key for decompressing said delta (X) into P(x), said deKey(x) having value of P(q).

3. The method of claim 1, wherein said pixel X has pixel position of (m,n)=(m-th row, n-th column) within said image, wherein said first K neighboring pixels have pixel positions (m−1, n−2), (m−1,n−1), (m−1, n), (m−1, n+1), and (m, n−1), wherein said first N pixel value differences are D1(m,n)=F(P(m−1,n−1), P(m−1−n)), D2(m,n)=F(P(m−1,n−1), P(m,n−1)), D3(m,n)=F(P(m,n−1), P(m−1,n)) and D4(m, n)=F(P(m,n−1), P(m−1,n−2)), wherein pixels (m−1,n), (m,n−1), (m−1,n+1) and (m−1,n−1) are associated respectively with D1(m,n), D2(m,n), D3(m,n) and D4(m,n).

4. The method of claim 3, wherein in response to D1(m,n) being greater than D2(m, n), D3(m, n) and D4(m, n), choose pixel (m−1,n) as said pixel Q, thereby setting said enKey(m, n)=P(m−1,n).

5. The method of claim 3, wherein in response to D2(m,n) being greater than D1(m,n), D3(m,n) and D4(m,n), choose pixel (m,n−1) as said pixel Q, thereby setting said enKey (m,n)=P(m,n−1).

6. The method of claim 3, wherein in response to D3(m,n) being greater than D1(m,n), D2(m,n) and D4(m,n), choose pixel (m−1,n+1) as said pixel Q, thereby setting said enKey (m,n)=P(m−1,n+1).

7. The method of claim 3, wherein in response to D4(m,n) being greater than D1(m,n), D2(m,n) and D3(m,n), choose pixel (m−1,n−1) as said pixel Q, thereby setting said enKey (m,n)=P(m−1,n−1).

8. The method of claim 3, wherein D1(m,n)=|P(m−1,n−1)−P(m−1−n)|, D2(m,n)=|P(m−1,n−1)−P(m,n−1)|, D3(m,n) =|P(m,n−1)−P(m−1,n)| and D4(m,n)=P(m,n−1)−P(m−1,n−

2)|, wherein pixels (m−1,n), (m,n−1), (m−1,n+1) and (m−1, n−1) are associated respectively with D1(m,n), D2(m,n), D3(m,n) and D4(m,n).

9. The method of claim 3, wherein D1(m,n)=P(m−1,n−1)$^2$−P(m−1−n)$^2$, D2(m,n)=P(m−1,n−1)$^2$−P(m,n−1)$^2$, D3(m,n)=P(m,n−1)$^2$−P(m−1,n)$^2$ and D4(m,n)=P(m,n−1)$^2$−P(m−1,n−2)$^2$, wherein pixels (m−1,n), (m,n−1), (m−1,n+1) and (m−1,n−1) are associated respectively with D1(m,n), D2(m,n), D3(m,n) and D4(m,n).

10. The method of claim 2, wherein said pixel x has pixel position of (m,n) within said image, wherein said second K neighboring pixels have pixel positions (m−1, n−2), (m−1, n−1), (m−1, n), (m−1, n+1), and (m, n−1), wherein said second N pixel value differences are d1(m,n)=f(P(m−1,n−1), P(m−1−n)), d2(m,n)=f(P(m−1,n−1), P(m,n−1)), d3(m,n)=f(P(m,n−1), P(m−1,n)) and d4(m,n)=f(P(m,n−1), P(m−1,n−2)), wherein pixels (m−1,n), (m,n−1), (m−1,n+1) and (m−1,n−1) are associated respectively with d1(m,n), d2(m,n), d3(m,n) and d4(m,n).

11. The method of claim 10, wherein in response to d1(m,n) being greater than d2(m,n), d3(m,n) and d4(m,n), choose pixel (m−1,n) as said pixel q, thereby setting said deKey(m,n)=P(m−1,n).

12. The method of claim 10, wherein in response to d2(m,n) being greater than d1(m,n), d3(m,n) and d4(m,n), choose pixel (m,n−1) as said pixel q, thereby setting said deKey(m,n)=P(m,n−1).

13. The method of claim 10, wherein in response to d3(m,n) being greater than d1(m,n), d2(m,n) and d4(m,n), choose pixel (m−1,n+1) as said pixel q, thereby setting said deKey(m,n)=P(m−1,n+1).

14. The method of claim 10, wherein in response to d4(m,n) being greater than d1(m,n), d2(m,n) and d3(m,n), choose pixel (m−1,n−1) as said pixel q, thereby setting said deKey(m,n)=P(m−1,n−1).

15. The method of claim 10, wherein d1(m,n)=|P(m−1,n−1)−P(m−1−n)|, d2(m,n)=|P(m−1,n−1)−P(m,n−1)|, d3(m,n)=|P(m,n−1)−P(m−1,n)| and d4(m,n)=|P(m,n−1)−P(m−1,n−2)|, wherein pixels (m−1,n), (m,n−1), (m−1,n+1) and (m−1,n−1) are associated respectively with d1(m,n), d2(m,n), d3(m,n) and d4(m,n).

16. The method of claim 10, wherein d1(m,n)=P(m−1,n−1)$^2$−P(m−1−n)$^2$, d2(m,n)=P(m−1,n−1)$^2$−P(m,n−1)$^2$, d3(m,n)=P(m,n−1)$^2$−P(m−1,n)$^2$ and d4(m,n)=P(m,n−1)$^2$−P(m−1,n−2)$^2$, wherein pixels (m−1,n), (m,n−1), (m−1,n+1) and (m−1,n−1) are associated respectively with d1(m,n), d2(m,n), d3(m,n) and d4(m,n).

17. A system for compressing and decompressing image signal said system comprises:
  a compression subsystem comprising:
    a first buffer adapted to store pixel values of first K neighboring pixels of a current processing pixel X;
    a compression engine adapted for compressing said current processing pixel X by decomposing its pixel value P(X) into delta(X)+enKey(X), wherein delta(X) is the difference between P(X) and enKey(X), and wherein enKey(X) is the encryption key of said X, said encryption key enKey(X) is equal to P(Q), the pixel value of a pixel Q that is chosen from among said first K buffered neighboring pixels of said current processing pixel X; and
  a decompression subsystem comprising:
    a second buffer adapted to store pixel values of neighboring pixels of a pixel x whose pixel value is to be determined by decompressing said compressed data delta(X) transmitted by an image capturing device that compresses the pixel value P(X) of said pixel X having the same pixel position as said pixel x within an image being compressed and decompressed; and
    a decompression module adapted to assign to said x a pixel value P(x) by decompressing delta(X) into delta(X)+deKey(x), said decryption key deKey(x) is P(q), the pixel value of a pixel q that is chosen from among said second K buffered neighboring pixel values of pixel x, wherein said pixel X has pixel position of (m,n)=(m-th row, n-th column) within said image, wherein said first K neighboring pixels have pixel positions (m−1, n−2), (m−1,n−1), (m−1, n), (m−1, n+1), and (m, n−1), wherein first N pixel value differences are D1(m,n)=F(P(m−1,n−1), P(m−1−n)), D2(m,n)=F(P(m−1,n−1), P(m,n−1)), D3(m,n)=F(P(m,n−1), P(m−1,n)) and D4(m,n)=F(P(m,n−1), P(m−1,n−2)), wherein pixels (m−1,n), (m,n−1), (m−1,n+1) and (m−1,n−1) are associated respectively with D1(m,n), D2(m,n), D3(m,n) and D4(m,n).

18. The system of claim 17, wherein in response to D1(m,n) being greater than D2(m,n), D3(m,n) and D4(m,n), choose pixel (m−1,n) as said pixel Q, thereby setting said enKey(m,n)=P(m−1,n).

19. The system of claim 17, wherein in response to D2(m,n) being greater than D1(m,n), D3(m,n) and D4(m,n), choose pixel (m,n−1) as said pixel Q, thereby setting said enKey(m,n)=P(m,n−1).

20. The system of claim 17, wherein in response to D3(m,n) being greater than D1(m,n), D2(m,n) and D4(m,n), choose pixel (m−1,n+1) as said pixel Q, thereby setting said enKey(m,n)=P(m−1,n+1).

21. The system of claim 17, wherein in response to D4(m,n) being greater than D1(m,n), D2(m,n) and D3(m,n), choose pixel (m−1,n−1) as said pixel Q, thereby setting said enKey(m,n)=P(m−1,n−1).

22. The system of claim 17, wherein D1(m,n)=|P(m−1,n−1)−P(m−1−n)|, D2(m,n)=|P(m−1,n−1)−P(m,n−1)|, D3(m,n)=|P(m,n−1)−P(m−1,n)| and D4(m,n)=|P(m,n−1)−P(m−1,n−2)|, wherein pixels (m−1,n), (m,n−1), (m−1,n+1) and (m−1,n−1) are associated respectively with D1(m,n), D2(m,n), D3(m,n) and D4(m,n).

23. The system of claim 17, wherein D1(m,n)=P(m−1,n−1)$^2$−P(m−1−n)$^2$, D2(m,n)=P(m−1,n−1)$^2$−P(m,n−1)$^2$, D3(m,n)=P(m,n−1)$^2$−P(m−1,n)$^2$ and D4(m,n)=P(m,n−1)$^2$−P(m−1,n−2)$^2$, wherein pixels (m−1,n), (m,n−1), (m−1,n+1) and (m−1,n−1) are associated respectively with D1(m,n), D2(m,n), D3(m,n) and D4(m,n).

24. The system of claim 17, wherein said pixel x has pixel position of (m,n) within said image, wherein said second K neighboring pixels have pixel positions (m−1, n−2), (m−1, n−1), (m−1, n), (m−1, n+1), and (m, n−1), wherein said second N pixel value differences are d1(m,n)=f(P(m−1,n−1), P(m−1−n)), d2(m,n)=f(P(m−1,n−1), P(m,n−1)), d3(m,n)=f(P(m,n−1), P(m$^{−1}$,n)) and d4(m,n)=f(P(m,n−1), P(m−1,n−2)), wherein pixels (m−1,n), (m,n−1), (m−1,n+1) and (m−1,n−1) are associated respectively with d1(m,n), d2(m,n), d3(m,n) and d4(m,n), wherein said d1(m,n), d2(m,n), d3(m,n) and d4(m,n) have the same numerical ranking as that of D1(m,n), D2(m,n), D3(m,n) and D4(m,n).

25. The system of claim 24, wherein in response to d1(m,n) being greater than d2(m,n), d3(m,n) and d4(m,n), choose pixel (m−1,n) as said pixel q, thereby setting said deKey(m,n)=P(m−1,n).

26. The system of claim 24, wherein in response to d2(m,n) being greater than d1(m,n), d3(m,n) and d4(m,n), choose pixel (m,n−1) as said pixel q, thereby setting said deKey(m,n)=P(m,n−1).

27. The system of claim 24, wherein in response to d3(m,n) being greater than d1(m,n), d2(m,n) and d4(m,n), choose pixel (m−1,n+1) as said pixel q, thereby setting said deKey(m,n)=P(m−1,n+1).

28. The system of claim 24, wherein in response to d4(m,n) being greater than d1(m,n), d2(m,n) and d3(m,n), choose pixel (m−1,n−1) as said pixel q, thereby setting said deKey(m,n)=P(m−1,n−1).

29. The system of claim 24, wherein d1(m,n)=|P(m−1,n−1)−P(m−1−n)|, d2(m,n)=|P(m−1,n−1)−P(m,n−1)|, d3(m,n)=|P(m,n−1)|P(m−1,n)| and d4(m,n)=|P(m,n−1)−P(m−1,n−2)|, wherein pixels (m−1,n), (m,n−1), (m−1,n+1) and (m−1,n−1) are associated respectively with d1(m,n), d2(m,n), d3(m,n) and d4(m,n).

30. The system of claim 24, wherein d1(m,n)=P(m−1,n−1)$^2$−P(m−1−n)$^2$, d2(m,n)=P(m−1,n−1)$^2$−P(m,n−1)$^2$, d3(m,n)=P(m,n−1)$^2$−P(m−1,n)$^2$ and d4 (m,n)=P(m,n−1)$^2$−P(m−1,n−2)$^2$, wherein pixels (m−1,n), (m,n−1), (m−1,n+1) and (m−1,n−1) are associated respectively with d1(m,n), d2(m,n), d3(m,n) and d4(m,n).

31. An image capturing device comprising:
a buffer adapted to store pixel values of K neighboring pixels of a current processing pixel X; and
a compression engine adapted for compressing said current processing pixel X by decomposing its pixel value P(X) into delta(X)+enKey(X), wherein delta(X) is the difference between P(X) and wherein enKey(X) is the encryption key of said X, said encryption key enKey (X) is equal to P(Q), the pixel value of a pixel Q that is chosen from among said K buffered neighboring pixels of said current processing pixel X, wherein said pixel Q is chosen based on a prediction that among said buffered neighboring pixel values of pixel X, P(Q) is similar in value to P(X), wherein said prediction does not require P(X).

32. The image capturing device of claim 31, wherein said pixel X has pixel position of (m,n)=(m-th row, n-th column) within said image, wherein said first K neighboring pixels have pixel positions (m−1, n−2), (m−1,n−1), (m−1, n), (m−1, n+1), and (m, n−1), wherein first N pixel value differences are D1(m,n)=F(P(m−1,n−1), P(m−1−n)), D2(m,n)=F(P(m−1,n−1), P(m,n−1)), D3(m,n)=F(P(m,n−1), P(m−1,n)) and D4(m,n)=F(P(m,n−1), P(m−1,n−2)), wherein pixels (m−1,n), (m,n−1), (m−1,n+1) and (m−1,n−1) are associated respectively with D1(m,n), D2(m,n), D3(m,n) and D4(m,n).

33. The image capturing device of claim 32, wherein in response to D1(m,n) being greater than D2(m,n), D3(m,n) and D4(m,n), choose pixel (m−1,n) as said pixel Q, thereby setting said enKey(m,n)=P(m−1,n).

34. The image capturing device of claim 32, wherein in response to D2(m,n) being greater than D1(m,n), D3(m,n) and D4(m,n), choose pixel (m,n−1) as said pixel Q, thereby setting said enKey(m,n)=P(m,n−1).

35. The image capturing device of claim 32, wherein in response to D1(m,n) being greater than D1(m,n), D2(m,n) and D4(m,n), choose pixel (m−1,n+1) as said pixel Q, thereby setting said enKey(m,n)=P(m⁻1,n+1).

36. The image capturing device of claim 32, wherein in response to D1(m,n) being greater than D1(m,n), D2(m,n) and D3(m,n), choose pixel (m−1,n−1) as said pixel Q, thereby setting said enKey(m,n)=P(m−1,n−1).

37. The image capturing device of claim 32, wherein D1(m,n)=|P(m−1,n−1)−P(m−1−n)|, D2(m,n)=|P(m−1,n−1)−P(m,n−1)|, D3(m,n)=|P(m,n−1)|P(m−1,n)| and D4(m,n)=|P(m,n−1)−P(m−1,n−2)|, wherein pixels (m−1,n), (m,n−1), (m−1,n+1) and (m−1,n−1) are associated respectively with D1(m,n), D2(m,n), D3(m,n) and D4(m,n).

38. The image capturing device of claim 32, wherein D1(m,n)=P(m−1,n−1)$^2$−P(m−1−n)$^2$, D2(m,n)=P(m−1,n−1)$^2$−P(m,n−1)$^2$, D3(m,n)=P(m,n−1)$^2$−P(m−1,n)$^2$ and D4(m,n)=P(m,n−1)$^2$−P(m−1,n−2)$^2$, wherein pixels (m−1,n), (m,n−1), (m−1,n+1) and (m−1,n−1) are associated respectively with D1(m,n), D2(m,n), D3(m,n) and D4(m,n).

39. An apparatus for performing decompression of image signal, said apparatus comprises:
a buffer adapted to store pixel values of K neighboring pixels of a pixel x whose pixel value is to be determined by decompressing a compressed data transmitted by an image capturing device that compresses into a compressed data delta(X) the pixel value P(X) of a pixel X having the same pixel position as said pixel x within an image being compressed and decompressed; and
a decompression module adapted to assign to said x a pixel value P(x) by decompressing said delta(X) into delta(X)+deKey(x), said decryption key deKey(x) is P(q), the pixel value of a pixel q that is chosen from among said K buffered neighboring pixel values of pixel x, wherein said pixel x has pixel position of (m,n) within said image, wherein said second K neighboring pixels have pixel positions (m−1, n−2), (m−1,n−1), (m−1, n), (m−1, n+1), and (m, n−1), wherein said second N pixel value differences are d1(m,n)=f(P(m−1,n−1), P(m−1−n)), d2(m,n)=f(P(m−1,n−1), P(m,n−1)), d3(m,n)=f(P(m,n−1), P(m−1,n)) and d4(m,n)=f(P(m,n−1), P(m−1,n−2)), wherein pixels (m−1,n), (m,n−1), (m−1,n+1) and (m−1,n−1) are associated respectively with d1(m,n), d2(m,n), d3(m,n) and d4(m,n).

40. The apparatus of claim 39, wherein in response to d1(m,n) being greater than d2(m,n), d3(m,n) and d4(m,n), choose pixel (m−1,n) as said pixel q, thereby setting said deKey(m,n)=P(m−1,n).

41. The apparatus of claim 39, wherein in response to d2(m,n) being greater than d1(m,n), d3(m,n) and d4(m,n), choose pixel (m,n−1) as said pixel q, thereby setting said deKey(m,n)=P(m,n−1).

42. The apparatus of claim 39, wherein in response to d3(m,n) being greater than d1(m,n), d2(m,n) and d4(m,n), choose pixel (m−1,n+1) as said pixel q, thereby setting said deKey(m,n)=P(m−1,n+1).

43. The apparatus of claim 39, wherein in response to d4(m,n) being greater than d1(m,n), d2(m,n) and d3(m,n), choose pixel (m−1,n−1) as said pixel q, thereby setting said deKey(m,n)=P(m−1,n−1).

44. The apparatus of claim 39, wherein d1(m,n)=|P(m−1,n−1)−P(m−1−n)|, d2(m,n)=|P(m−1,n−1)−P(m,n−1)|, d3(m,n)=|P(m,n−1)−P(m−1,n)| and d4(m,n)=|P(m,n−1)−P(m−1,n−2)|, wherein pixels (m−1,n), (m,n−1), (m−1,n+1) and (m−1,n−1) are associated respectively with d1(m,n), d2(m,n), d3(m,n) and d4(m,n).

45. The apparatus of claim 39, wherein d1(m,n)=P(m−1,n−1)$^2$−P(m−1−n)$^2$, d2(m,n)=P(m−1,n−1)$^2$−P(m,n−1)$^2$, d3(m,n)=P(m,n−1)$^2$−P(m−1,n)$^2$ and d4(m,n)=P(m,n−1)$^2$−P(m−1,n−2)$^2$, wherein pixels (m−1,n), (m,n−1), (m−1,n+1) and (m−1,n−1) are associated respectively with d1(m,n), d2(m,n), d3(m,n) and d4(m,n).

* * * * *

UNITED STATES PATENT AND TRADEMARK OFFICE
CERTIFICATE OF CORRECTION

PATENT NO. : 7,266,245 B1
APPLICATION NO. : 10/112265
DATED : September 4, 2007
INVENTOR(S) : Shang-Hung Lin It is certified that error appears in the above-identified patent and that said Letters Patent is hereby corrected as shown below:

Column 10, entire line 67
Change "=|P(m,n-1)-P(m-1,n)| and D4(m,n)=P(m,n-1)-P(m-1,n-" to read
-- =|P(m,n-1)-P(m-1,n)| and D4(m,n)=|P(m,n-1)-P(m-1,n- --

Column 11, entire line 6
Change "n)=P(m,n-1) $^2$-P(m-1,n)$^2$ and D4(m,n)=P(m,n-1)$^2$-P(m-" to read
-- n)=P(m,n-1)$^2$-P(m-1,n)$^2$ and D4(m,n)=P(m,n-1)$^2$-P(m- --

Column 12, entire line 48
Change "24. The system of claim 17, wherein said pixel x has pixel" to read
-- 24. The system of claim 16, wherein said pixel x has pixel" to read --

Column 12, entire line 54
Change "(P(m,n-1), P(m¯n)) and d4(m,n)=f(P(m,n-1), P(m=1,n-" to read
-- (P(m,n-1), P(m-n)) and d4(m,n)=f(P(m,n-1), P(m=1,n- --

Column 13, entire line 9
Change "29. The system of claim 24, wherein d1(m,n)=P(m-1,n-" to read
-- 29. The system of claim 24, wherein d1(m,n)=|P(m-1,n- --

Column 13, entire line 11
Change "=|P(m,n-1)|P(m-1,n)| and d4(m,n)=|P(m,n-1)-P(m-1,n-2)|," to read
-- =|P(m,n-1)-P(m-1,n)| and d4(m,n)=|P(m,n-1)-P(m-1,n-2)|, --

Column 13, entire line 56
Change "response to D1(m,n) being greater than D1(m,n), D2(m,n)" to read
-- response to D3(m,n) being greater than D1(m,n), D2(m,n) --

Column 13, entire line 58
Change "thereby setting said enKey(m,n)=P(m¯1,n+1)." to read -- thereby setting said enKey(m,n)=P(m-1,n+1) --

Column 13, entire line 60
Change "response to D1(m,n) being greater than D1(m,n), D2(m,n)" to read -- response to D4(m,n) being greater than D1(m,n), D2(m,n) --

Column 13, entire line 65
Change "P(m,n-1)|, D3(m,n)=|P(m,n-1)|P(m-1,n)| and D4(m,n)=|P" to read
-- P(m,n-1)|, D3(m,n)=|P(m,n-1)-P(m-1,n)| and D4(m,n)=|P --

UNITED STATES PATENT AND TRADEMARK OFFICE
CERTIFICATE OF CORRECTION

PATENT NO. : 7,266,245 B1
APPLICATION NO. : 10/112265
DATED : September 4, 2007
INVENTOR(S) : Shang-Hung Lin It is certified that error appears in the above-identified patent and that said Letters Patent is hereby corrected as shown below:

Column 14, entire line 59
Change "$n-1)^2-P(m-1-n)2,\ \ d2(m,n)=P(m-1,n-1)^2-P(m,n-1)^2$," to read
-- $n-1)^2-P(m-1-n)^2, d2(m,n)=P(m-1,n-1)^2-P(m,n-1)^2$ --

Signed and Sealed this

Twenty-ninth Day of September, 2009

David J. Kappos
*Director of the United States Patent and Trademark Office*